United States Patent [19]
Genov et al.

[11] Patent Number: 5,771,748
[45] Date of Patent: Jun. 30, 1998

[54] HIGHLY STABLE Z AXIS DRIVE

[75] Inventors: Genco Genov, Sunnyvale; Gou-Kin Cui, Fremont, both of Calif.

[73] Assignee: Genmark Automation, Sunnyvale, Calif.

[21] Appl. No.: 592,227

[22] Filed: Jan. 26, 1996

[51] Int. Cl.$^6$ ............... F16H 25/20; B25J 5/02; B25J 18/00
[52] U.S. Cl. ................. 74/490.03; 74/490.04; 414/744.3; 901/15
[58] Field of Search ............ 74/89.15, 490.03, 74/490.04; 414/744.3, 744.5; 901/15, 16, 17

[56] References Cited

U.S. PATENT DOCUMENTS

| | | | |
|---|---|---|---|
| 4,166,543 | 9/1979 | Dahlstrom | 414/749 |
| 4,466,307 | 8/1984 | Kouno | 74/103 X |
| 4,664,587 | 5/1987 | Case, Jr. et al. | 414/680 |
| 4,762,459 | 8/1988 | Morita et al. | 414/680 |
| 5,064,340 | 11/1991 | Genov et al. | 414/744.5 |
| 5,178,512 | 1/1993 | Skrobak | 414/744.5 |
| 5,220,849 | 6/1993 | Lande et al. | 74/479 |

FOREIGN PATENT DOCUMENTS

| | | |
|---|---|---|
| 0 410 823 A1 | 1/1991 | European Pat. Off. . |
| 2 120 202 | 11/1983 | United Kingdom . |

*Primary Examiner*—Allan D. Herrmann
*Attorney, Agent, or Firm*—Burns, Doane, Swecker & Mathis, LLP

[57] ABSTRACT

A vertical positioner comprises a rigid frame. A rigid vertically extending structure extends upwardly from a base to its upper end portion. A generally horizontal flange forms the structure upper end portion. It has a central opening and at least two peripheral openings. A vertically movable structure is telescopically mounted to the frame. It comprises an upper plate located above the flange. A lower generally parallel plate is located below the flange. A pair of parallel rods extend between the plates and pass through flange bearings. A central tube is connected between the lower and upper plates and passes through the flange via bearings. A motor is supported rigidly relative to the base for motivating relative vertical motion.

3 Claims, 2 Drawing Sheets

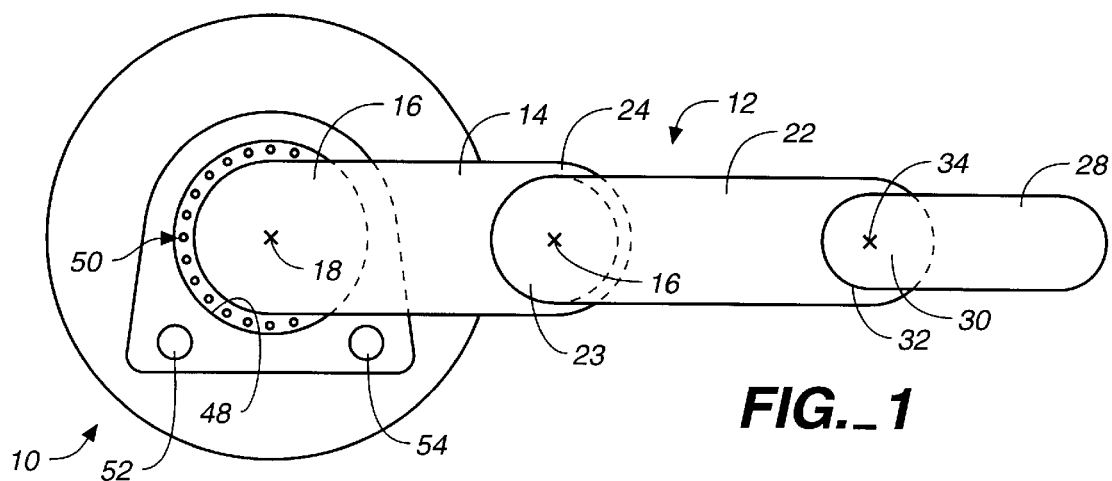
FIG._1
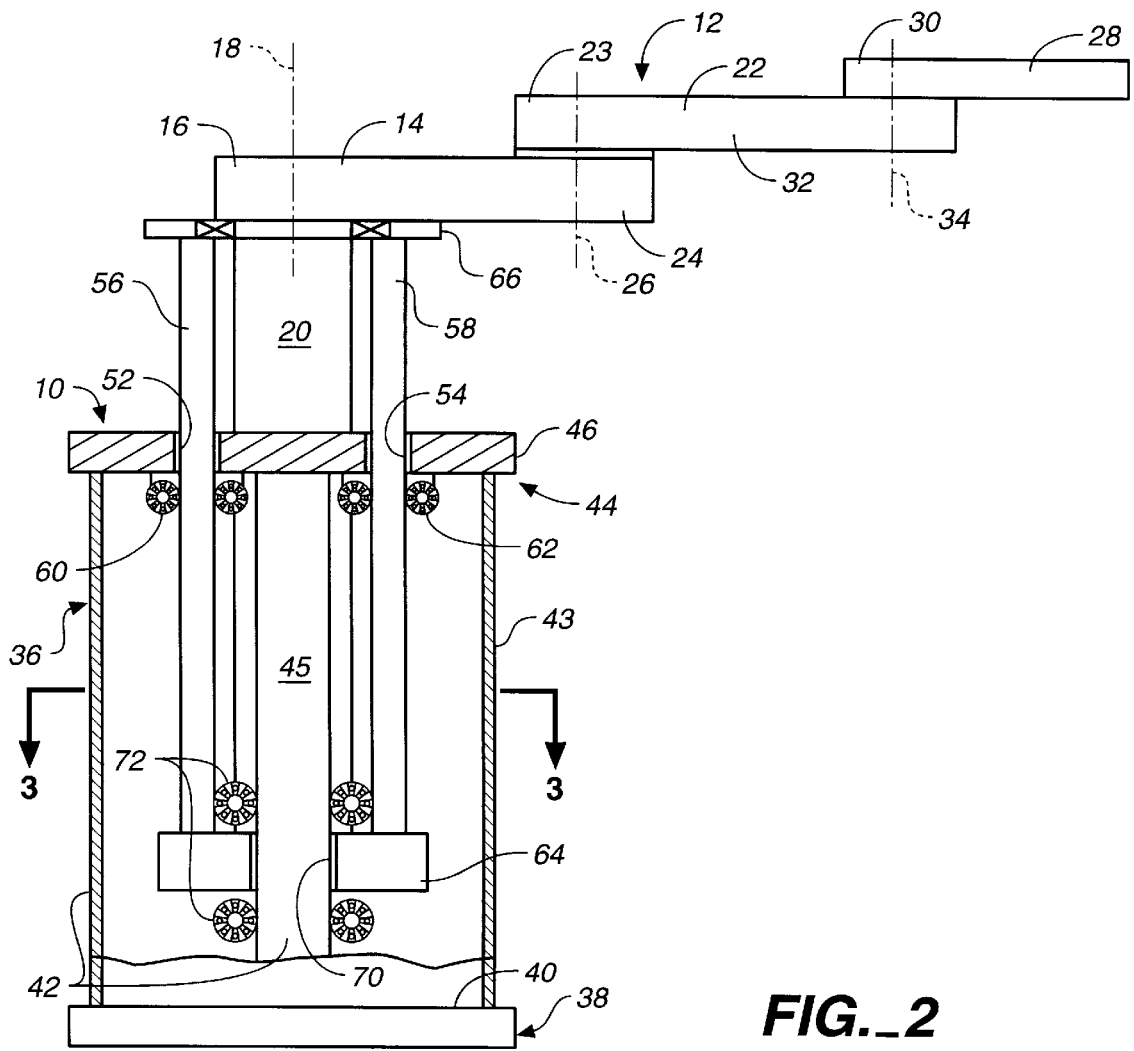
FIG._2

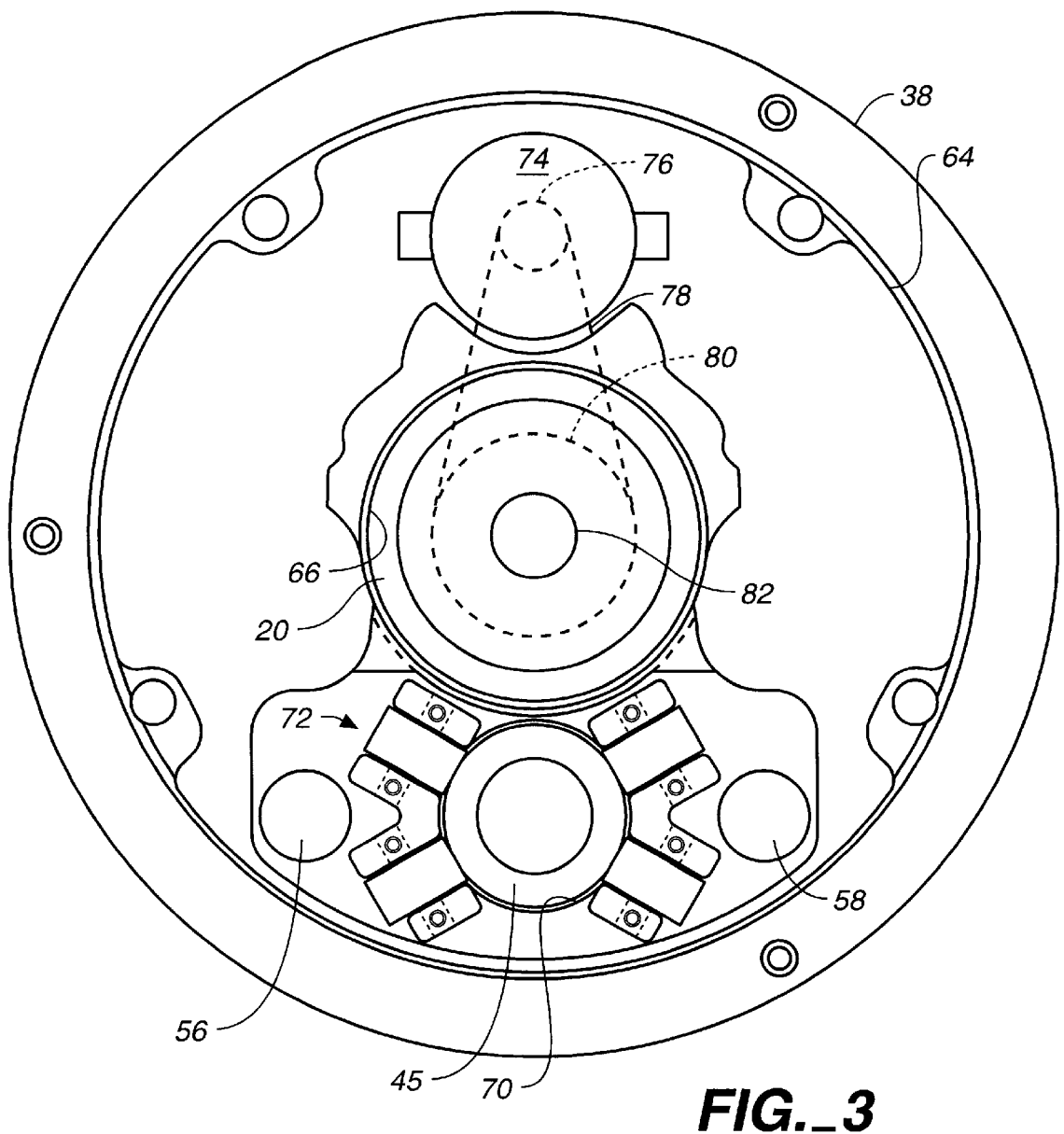
FIG._3

HIGHLY STABLE Z AXIS DRIVE

TECHNICAL FIELD

The present invention relates to a highly stable Z- axis drive for a robotic arm mechanism having Z-, R- and θ- motion capability.

BACKGROUND OF INVENTION

The use of robot arms for positioning and placing objects is well known. Generally, the arms have Z-, R- and θ- motion in a conventional cylindrical coordinate system. The capability of providing straight line motion is very important in the processing of semiconductor wafers so as to allow them to be very accurately positioned at a work station where processing steps take place. It is also very important that the arm have the capability to accurately position larger and heavier objects such as flat panel displays, reticles, hard disks, CD ROMs, ceramic substrates and the like. More recently, it has become possible to construct robotic arms which will extend relatively long distances from their support structures (from the Z-axis). The combination of positioning of relatively heavy objects and longer distances from the Z-axis for the arms creates a resulting increased need for handling of the larger torque without loss of accuracy.

The R or straight line movement of the end effector or mechanical hand at the end of the arm has been accomplished in a number of manners. As one example, telescoping arms have been utilized for this purpose. In such a structure one slidable member fits within another thus allowing linear extension of the arm.

More commonly, two link arms with equal length links have been utilized for this purpose. The links are connected to each other so that distal end of the first link is pivotally attached to the proximal end of the second link. The links utilize belt drives which are provided for coordinately rotating the second link to the first link to provide a rotation ratio, $i_{2,1}$ of 2/1, and to provide a rotation ratio, $i_{3,2}$ of 1/2 between the end effector and the distal link of the robotic arm. When $i_{2,1}$ is equal to 2/1 and $i_{3,2}$ is equal to 1/2, the result is that $i_{3,1}$, the rotation ratio of the end effector relative to the first link, is equal to $2/1 \times 1/2$ or unity and straight line motion results. In the case of 3 link arms, such as those shown in U.S. Pat. No. 5,064,340 which is included herein in its entirety by reference), the rotation ratio between the third and second links is 1/1 and other ratios are as just discussed above. In this situation $i_{2,1}$ is equal to 2/1, $i_{3,2}$ is equal to 1/1 and $i_{4,3}$ is equal to 1/2. This assures that $i_{4,1}$ is equal to unity and straight line motion results. This structure allows the arm to extend outwardly a further radial distance for an equal laterally collapsed profile.

United Kingdom Patent Application GB 2193482A, published Feb. 10, 1988 discloses a wafer handling arm which includes two unequal length links with the distal end of one link being pivotally attached to the proximal end of the other link, with the hand being integral with the distal end of the distal link and which utilizes a belt drive which is fixed to a cam to attain nearly straight line motion.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted. This linkage provides drive directly from a motor shaft to the proximal end portion of the proximal link. A belt about a stationary pulley coaxial with the motor shaft passes about a pulley at the point of pivoting of the two links to one another. Another pulley and belt arrangement provides pivoting of another pulley where the second link is pivotally connected to the mechanical hand.

In another apparatus a pair of isosceles triangle type linkages face one another and the mechanical hand is pivotally attached to the distal ends of both of the distal links. The proximal ends of each of the proximal links is driven in an opposite direction of rotation by a single rotating motor shaft, generally through use of appropriate gearing. What results is a frogs leg type of motion with each isosceles triangle type linkage serving as means for controlling the other such linkage in such a manner that the angles between the two links of each of the isosceles triangle linkages changes at twice the rate as do the angles that each of the links makes with a line connecting the points about which their other ends are pivoted.

As mentioned previously, the moving of relatively heavy objects puts considerable strain on the robotic arm system. Such systems are conventionally supported by the Z- direction movable portion of the Z- , R- and θ- motion robotic arm. That is, they are conventionally supported by a single cylindrical tube which moves up and down under the impetus of the Z-axis motor. The result with heavy loads can be twisting or tilting of the apparatus which leads to misalignment of the relatively heavy load. This, in turn, can lead to production delays and/or the production of damaged (unmarketable) product.

DISCLOSURE OF INVENTION

The present invention is directed to overcoming one or more of the problems as set forth above.

An embodiment of the invention is a vertical positioner. It comprises a rigid frame comprising a base and a rigid vertically extending structure. The structure extends upwardly from the planar surface to its upper end portion. A flange is attached to the structure upper end portion. The flange is generally parallel to the planar surface. It has a central opening and at least two peripheral openings. Central opening bearing means adjacent the central opening defining a central bearing region. Peripheral opening bearing means adjacent each of the peripheral openings define respective peripheral bearing regions. A vertically movable structure is telescopically mounted to the rigid frame. It comprises an upper plate located above the flange. A lower plate is located below the flange generally parallel to the upper plate. A pair of linearly extending generally parallel members extend from the upper plate to the lower plate. The members are generally orthogonal relative to the plates and pass through the respective peripheral bearing in bearing contact. A central tube is connected between the lower and upper plates in orthogonal relation and passes through the central bearing region in bearing contact. Motor means are supported rigidly relative to the base for motivating the linearly extending members selectively upwardly and downwardly relative to the base.

The construction of the invention provides three position support of the arm mechanism, the three positions being where the linearly extending members pass through the flange added to where the center tube passes through the flange. This greatly increases the rigidity and strength of the overall robotic arm structure whereby relatively heavy objects can be readily handled with the extreme accuracy necessary in the semiconductor industry.

BRIEF DESCRIPTION OF THE DRAWINGS

The invention will be better understood by reference to the figures of the drawings wherein like numbers denote like parts throughout and wherein:

FIG. 1 illustrates, in side sectional view a structure in accordance with an embodiment of the present invention;

FIGS. 2 illustrates, in top view, the apparatus illustrated in Figure; and

FIG. 3 illustrates a view taken along the line 3—3 of FIG. 1.

DETAILED DESCRIPTION OF INVENTION

While the invention in at least some of its aspects is useful in a number of different environments, it has been designed with the idea in mind of its being used with a robotic arm mechanism of the nature used for positioning specific workpieces, including semiconductor wafers, during their processing. Accordingly, the discussion which follows will utilize terms common to that industry, including terms such as wafers, end effectors, etc. However, it should be noted that the invention is not so limited and that other workpieces than semiconductor wafers may be picked up and/or positioned in accordance with the present invention. Indeed, the invention is specifically concerned with providing a robotic arm mechanism which is not only useful for positioning semiconductor wafers but is also useful for accurately positioning much heavier objects.

For a better understanding of the invention it should be noted that the terms "belt", "belt means", "pulley" and "pulley means" are, at times, referred to as gearing. It should further be understood that the terms "belt" and "belt means" are used broadly to include toothed and untoothed constructions, chains, fabric belts, woven belts and the like. They may be constructed of any suitable material, natural or synthetic, organic, inorganic, polymeric, composite or metallic. Likewise the terms "pulley" and "pulley means" are used broadly to include toothed and untoothed constructions, constructions which positively engage with respective belts or which engage only frictionally with such belts. They too may be constructed of any suitable material, natural or synthetic, organic, inorganic, polymeric, composite or metallic. With this in mind the following detailed discussion of the invention will be set forth. It should further be noted that the term "rod" includes tubular members. and that the terms "tube" and "rod" are not limited to circular cross section objects, unless specifically stated to be so, but include objects of any suitable cross section.

FIGS. 1 and 2 illustrate a vertical positioner 10 in accordance with the invention. The vertical positioner 10 is adapted for providing vertical motion to a robotic arm mechanism which provides R- and θ- motion, as well as the Z- motion provided in accordance with the invention, to robotic arm 12 which includes a first link 14 pivotally mounted at its proximal end portion 16 to rotate about axis 18 which is carried by center tube 20. A second link 22 is pivotally mounted at its proximal end portion 23 to a distal end portion 24 of the first link 14 for rotation about axis 26 which is parallel to axis 18. An end effector 28 is mounted at its proximal end portion 30 to a distal end portion 32 of the second link 22 for rotation about an axis 34 which is parallel to the axes 18 and 26. The R- motion is provided by rotation of the center tube 20. The θ- motion is provided by a coaxial tube passing vertically through the center tube 20. For details of a particular useful structure adaptable for use with the present invention one may refer to previously mentioned U.S. Pat. No. 5,064,340.

The center tube 20 is mounted to a frame 36 in a manner which provides added stability and the ability to carry relatively heavy loads on the end effector 28. The frame 36 may itself be mounted on an elevator (not shown), It comprises a base 38 having an upwardly facing surface 40, a rigid vertically extending structure 42, in the embodiment illustrated a cylindrical wall 43 plus a stationary support 45, and a structure upper end portion 44. The structure 42 extends upwardly in a generally orthogonal manner from the base 38 to the structure upper end portion 44. A flange 46 is attached to and supported by the structure upper end portion 44. The flange 46 is generally horizontal. It has a central opening 48 through which the center tube 20 fits and in which the center tube 20 is bearingly held for free (θ-) rotation by bearing 50 It also has at least two peripheral openings 52, 54 through which support rods 56, 58 fit. Bearings 60, 62 support the support rods 56, 58.

The support rods 56, 58 extend from a lower plate 64 to a parallel upper plate 66 located above the flange 46. The support rods 56, 58, the center tube 20 and the plates 64, 66 form a Z- axis (vertically) movable structure 68. The lower plate 64 has an opening 70 which fits about the stationary support 45. Bearings 72 above and below the lower plate 64 allow it to move vertically along a specific path and provide positive support from the stationary support 45.

Motivation of movement along the vertical axis 18 is provided by a motor 74 mounted in stationary relation to the frame 36. It drives a drive pulley 76 which, via a belt 78, drives a driven pulley 80 thereby causing a lead screw 82, which is rotatably mounted to the flange 46 and the base 38, to rotate relative to the frame 36. A cylindrical bracket has a threaded bore engaged with the lead screw 82 and is attached to the tube 20. As the lead screw 82 is rotated the bracket, and with it the vertically moveable structure 68, moves upwardly or downwardly depending on the direction of rotation of the driven pulley 80.

Referring to FIG. 3, it will be noted that the rods 56, 58 and the center tube 20 are not in a straight line. This is desirable to provide full strengthening and rigidity to the overall structure.

INDUSTRIAL APPLICABILITY

The present invention provide a very rigid Z- motion structure for a robotic arm 12 useful for a number of things, including semiconductor wafer processing, and which is capable of accurately moving relatively heavy loads.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A vertical positioner, comprising:
    a rigid frame comprising:
        a base;
        a rigid vertically extending structure having a structure upper end portion, the structure extending upwardly in a generally orthogonal manner from base to the structure upper end portion; and
        a flange attached to the structure upper end portion, the flange being generally horizontally aligned, the flange having a central opening and at least two peripheral openings;
    central opening bearing means adjacent the central opening defining a central bearing region;

peripheral opening bearing means adjacent each of the peripheral openings defining respective peripheral bearing regions;

a vertically movable structure telescopically mounted to the rigid frame, comprising:
- an upper plate located above the flange;
- a lower plate located below the flange generally parallel to the upper plate;
- a pair of linearly extending generally parallel members, each of the members having a respective upper end portion and a respective lower end portion, each of the members extending from the upper plate to the lower plate, the members each being generally orthogonal relative to the plates and passing through the respective peripheral bearing in bearing contact therewith;
- a central tube connected between the lower plate and the upper plate in orthogonal relation thereto and passing through the central bearing region in bearing contact therewith;

motor means supported rigidly relative to the base for motivating the linearly extending members selectively upwardly and downwardly relative to the base.

2. A vertical positioner as set forth in claim 1, wherein the connection of the motor means to motivate the linearly extending members comprises:

lead screw means supported between the base and the flange and being rotatable relative thereto, the lead screw means being located within the central tube and adapted to operate in such a manner that rotation of the lead screw means imparts linear motion upwardly and downwardly to the central tube; and belt means driven by the motor means and being engaged to rotate the lead screw means.

3. A vertical positioner as set forth in claim 2, further including:

an article positioning apparatus comprising a first link having a proximal end portion coaxial with the axis of the tube; a second link pivotally mounted to the distal end portion of the first link and an end effector pivotally mounted to the distal end portion of the second link, the pivotal mountings all being about vertical axes.

* * * * *